(12) United States Patent
Zhang et al.

(10) Patent No.: US 12,323,945 B1
(45) Date of Patent: Jun. 3, 2025

(54) METHOD FOR POSITIONING AND POSITIONING DEVICE AND ACCESS POINT PERFORMING THE METHOD

(71) Applicant: TP-LINK CORPORATION PTE. LTD., Singapore (SG)

(72) Inventors: Haojie Zhang, Chengdu (CN); Jiaxin Chen, Chengdu (CN); Kan Wu, Chengdu (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/667,493

(22) Filed: May 17, 2024

(51) Int. Cl.
*H04W 64/00* (2009.01)
*H04W 12/06* (2021.01)
*H04W 12/63* (2021.01)
*H04W 52/02* (2009.01)
*H04W 84/12* (2009.01)

(52) U.S. Cl.
CPC .......... *H04W 64/00* (2013.01); *H04W 12/06* (2013.01); *H04W 12/63* (2021.01); *H04W 52/0235* (2013.01); *H04W 52/0274* (2013.01); *H04W 84/12* (2013.01)

(58) Field of Classification Search
CPC ..... H04W 64/00; H04W 12/63; H04W 12/06; H04W 52/0235; H04W 52/0274; H04W 84/12
See application file for complete search history.

(56) References Cited

U.S. PATENT DOCUMENTS

| | | | |
|---|---|---|---|
| 10,542,029 B2 * | 1/2020 | Lapidous | H04L 63/0272 |
| 11,147,117 B2 * | 10/2021 | Charbit | H04L 67/12 |
| 11,959,750 B2 * | 4/2024 | Korneluk | H04W 52/0254 |
| 12,015,958 B2 * | 6/2024 | Liberg | H04W 64/00 |
| 2019/0268744 A1 * | 8/2019 | Bransfield | G06F 8/41 |
| 2020/0367020 A1 * | 11/2020 | Ansley | H04W 16/14 |
| 2021/0195416 A1 * | 6/2021 | Mese | H04W 60/04 |
| 2022/0272544 A1 * | 8/2022 | Chitrakar | H04W 72/0453 |
| 2024/0114463 A1 * | 4/2024 | Clancy | H04W 4/023 |
| 2024/0119540 A1 * | 4/2024 | Miller | G06F 16/29 |
| 2024/0210570 A1 * | 6/2024 | Cai | G01S 19/34 |
| 2024/0349031 A1 * | 10/2024 | Rico Alvarino | H04W 76/27 |
| 2025/0031216 A1 * | 1/2025 | Mondet | H04L 5/0048 |

FOREIGN PATENT DOCUMENTS

| | | |
|---|---|---|
| CN | 105143825 A | 12/2015 |
| CN | 115250428 A | 10/2022 |
| CN | 113219504 B | 4/2023 |

* cited by examiner

*Primary Examiner* — Khawar Iqbal
(74) *Attorney, Agent, or Firm* — Loeb & Loeb LLP

(57) ABSTRACT

This disclosure provides a method for positioning performed by a positioning device, including: waking up the positioning device; obtaining Wi-Fi configuration information of an access point (AP); associating the positioning device with the AP based on the Wi-Fi configuration information; initiating positioning function to determine a location of the positioning device based on a predetermined condition is met; transmitting the location of the positioning device to the AP; and switching the positioning device into a sleep state.

16 Claims, 10 Drawing Sheets

METHOD FOR POSITIONING AND POSITIONING DEVICE AND ACCESS POINT PERFORMING THE METHOD

TECHNICAL FIELD

The present disclosure relates to wireless communication, and more specifically, to a method for positioning and a positioning device and an access point (AP) performing the method.

BACKGROUND

With the 6 GHz band opened by the Federal Communications Commission (FCC), the AP can enjoy high data rate video streams at home and in outdoor stadiums, parking lots, outdoor cafes and other places. FCC defines a standard power Automated Frequency Coordination (AFC) control mode to authorize indoor and outdoor operations of the AP. Thus, the AP has to carry out AFC authentication every day.

The most important thing for the AP with 6 GHz band to carry out the AFC authentication is to obtain the geographical location information of the AP. The FCC's confidence in geographical location information is 95% and thus it requires the geographical location information to have extremely high precision and accuracy.

There are currently many positioning techniques, such as Internet Protocol (IP) address positioning technique, Wi-Fi positioning technique, GPS positioning technique and so on, for obtaining the location information of the AP.

SUMMARY

The present disclosure provides a method for positioning to assist in positioning of the AP, for example, for the AFC authentication.

According to an aspect of the present disclosure, there is provided a method for positioning performed by a positioning device, comprising: waking up the positioning device; obtaining Wi-Fi configuration information of the AP; associating the positioning device with the AP based on the Wi-Fi configuration information; initiating positioning function to determine a location of the positioning device based on a predetermined condition being met; transmitting the location of the positioning device to the AP; and switching the positioning device into a sleep state.

In some embodiments, the predetermined condition comprises an instruction for initiating the positioning function being received from the AP, wherein the method further comprises switching the positioning device into a sleep state after receiving an instruction for not initiating the positioning function from the AP.

In some embodiments, the method further comprises: broadcasting information for discovering the AP, wherein obtaining the Wi-Fi configuration information of the AP comprises: receiving the Wi-Fi configuration information from the AP.

In some embodiments, broadcasting information for discovering the AP comprises: broadcasting an encrypted Probe Request frame including verification information for the AP to verify the positioning device; obtaining the Wi-Fi configuration information of the AP comprises: receiving the Wi-Fi configuration information encrypted with a preset public key, wherein the Wi-Fi configuration information includes a Service Set Identifier (SSID) of the AP, a password, and a token; decrypting the Wi-Fi configuration information with a preset private key corresponding to the preset public key to obtain the SSID, the password and the token; associating the positioning device with the AP comprises: associating the positioning device with the AP using the SSID and the password; the Wi-Fi configuration information encrypted with a preset public key is transmitted by the AP after verifying the positioning device using the verification information; and the token is to be used by the AP to login to the positioning device such that the positioning device can transmit the location of the positioning device to the AP.

In some embodiments, the method further comprises: in a case that the associating fails, switching the positioning device into a sleep state; and waking up the positioning device after a time interval based on the number of times that the associating has failed.

In some embodiments, wherein the predetermined condition further comprises: the positioning device being woken up.

In some embodiments, waking up the positioning device comprises: waking up the positioning device at a predetermined wake-up time; or waking up the positioning device in response to receiving an instruction for waking up the positioning device.

In some embodiments, the predetermined wake-up time is determined by: initiating the positioning function to determine the location of the positioning device at each of a plurality of tested wake-up times; obtaining one or more positioning parameters for each of the plurality of tested wake-up times; and determining one of the plurality of tested wake-up times as the predetermined wake-up time based on the one or more positioning parameters for each of the plurality of tested wake-up times.

In some embodiments, the one or more positioning parameters for each of a plurality of tested wake-up times comprise at least one of: a positioning duration taken by the positioning corresponding to the tested wake-up time, a number of satellites used during the positioning corresponding to the tested wake-up time, or strength of signals emitted by the satellites during the positioning corresponding to the tested wake-up time.

According to another aspect of the present disclosure, there is provided a method for positioning performed by an AP, comprising: associating a positioning device with the AP using a Wi-Fi configuration information after the positioning device being woken up; receiving a location of the positioning device from the positioning device; determining a location of the AP based on the location of the positioning device; and disconnecting from the positioning device such that the positioning device switches into a sleep state.

In some embodiments, the method further comprises: transmitting, to the positioning device, an instruction for initiating a positioning function of the positioning device for determining a location of the positioning device in response to the AP being restarted in a predetermined period, or transmitting, to the positioning device, an instruction for not initiating the positioning function of the positioning device for determining the location of the positioning device in response to the AP being not restarted in a predetermined period.

In some embodiments, the method further comprises: receiving, from the positioning device, information for discovering the AP; and transmitting, to the positioning device, the Wi-Fi configuration information of the AP such that the positioning device can associate the positioning device with the AP using the Wi-Fi configuration information.

In some embodiments, receiving the information for discovering the AP comprises: receiving an encrypted Probe Request frame including verification information for the AP to verify the positioning device; transmitting the Wi-Fi configuration information of the AP comprises: transmitting Wi-Fi configuration information encrypted with a preset public key after verifying the AP using the verification information, the Wi-Fi configuration information includes a Service Set Identifier (SSID) of the AP, a password and a token, and the SSID and the password are to be used for the associating; the token is to be used by the AP to login to the positioning device.

In some embodiments, the method further comprises: transmitting the verification information to a server after receiving the encrypted Probe Request frame; receiving the preset public key and the token from the server; and encrypting the Wi-Fi configuration information including the SSID, the password and the token with the preset public key.

In some embodiments, the method further comprises: performing AFC authentication using the location of the AP.

In some embodiments, the method further comprises: transmitting an instruction for waking up the positioning device at a predetermined wake-up time or in response to the AP being restarted in a predetermined period.

In some embodiments, the method further comprises: synchronizing the location of the positioning device with other APs which are within the same WLAN with the AP.

In some embodiments, synchronizing the location of the positioning device with other APs comprises: setting a broadcast address for the synchronizing; transmitting a Beacon frame including the broadcast address and information for the other APs to verify the AP; and transmitting the location of the positioning device to the broadcast address, wherein the broadcast address is accessed by the other APs to obtain the location of the positioning device after verifying the AP.

In some embodiments, wherein determining the location of the AP comprises: determining the location of the AP based on the location of the positioning device and Received Signal Strength Indication (RRSI); or obtaining information indicating a location offset between the AP and the positioning device, and determining the location of the AP based on the location offset and the location of the positioning device.

In some embodiments, the AP transmits to the positioning device ephemeris almanac for positioning and/or firmware file for updating firmware after the associating.

According to yet another aspect of the present disclosure, there is provided a system for positioning, comprising a positioning device and an AP. The positioning device comprises: a processor; and a memory, coupled to the processor, the processor is configured for: waking up the positioning device; obtaining Wi-Fi configuration information of the AP; associating the positioning device with the AP based on the Wi-Fi configuration information; initiating positioning function to determine a location of the positioning device based on a predetermined condition being met; transmitting the location of the positioning device to the AP; and switching the positioning device into a sleep state. The AP comprises a processor; and a memory, coupled to the processor, the processor is configured for: associating a positioning device with the AP using the Wi-Fi configuration information after the positioning device being woken up; receiving a location of the positioning device from the positioning device; determining a location of the AP based on the location of the positioning device. Wherein the positioning device is installed at an outdoor location; and disconnecting from the positioning device such that the positioning device switches into the sleep state.

According to yet another aspect of the present disclosure, there is provided a positioning device, comprising: a processor; and a memory, coupled to the processor, the processor is configured to carry out the above method for positioning performed by a positioning device.

According to yet another aspect of the present disclosure, there is provided an AP, comprising: a processor; and a memory, coupled to the processor, the processor is configured to carry out the above method for positioning performed by an AP.

According to yet another aspect of the present disclosure, there is provided a computer-readable medium, storing instructions thereon that, when executed by a computer cause the computer to carry out the above method for positioning performed by a positioning device.

According to yet another aspect of the present disclosure, there is provided a computer-readable medium, storing instructions thereon that, when executed by a computer cause the computer to carry out the above method for positioning performed by an AP.

At least based on the above embodiments of the present disclosure, the positioning device can connect with the AP via the WLAN of the AP. The positioning device can determine its location and then transmit its location to the AP to assist the AP in determining the location of the AP. This eliminates the need for a built-in GPS module for the AP. The positioning device can be installed outdoors and thus the accuracy of the determined location of the AP can be improved, thereby the success rate of the AFC authentication can be improved. The positioning device is a device dedicated to assisting the AP in positioning. The positioning device can switch into the sleep state after transmitting its location to the AP and wake up until its location is next needed to be provided to the AP, so the power of the positioning device is consumed almost exclusively to assist the AP in positioning. This maximizes the amount of time that the positioning device can be used after a single charge, which is especially beneficial for the positioning device installed outdoors.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure but do not constitute a limitation on the present disclosure. In the drawings, unless otherwise explicitly indicated, the same reference numerals refer to the same components, steps or elements. In the accompanying drawings.

DETAILED DESCRIPTION

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occurs therebetween.

In the present disclosure, an AP, which may be interchangeably referred to as a wireless AP (WAP), is a communication device that can communicate with a non-AP (e.g., a station (STA), client device or the positioning device) in a WLAN and that allows the non-AP to connect to a wired network. The AP usually connects to a router (via a wired network) as a standalone device, but it can also be integrated with or employed in the router.

In the present disclosure, a positioning device can be any positioning device that can determine its own position, such as a GPS device. The positioning device is also a communication device that can communicate with the AP.

Figure 1:
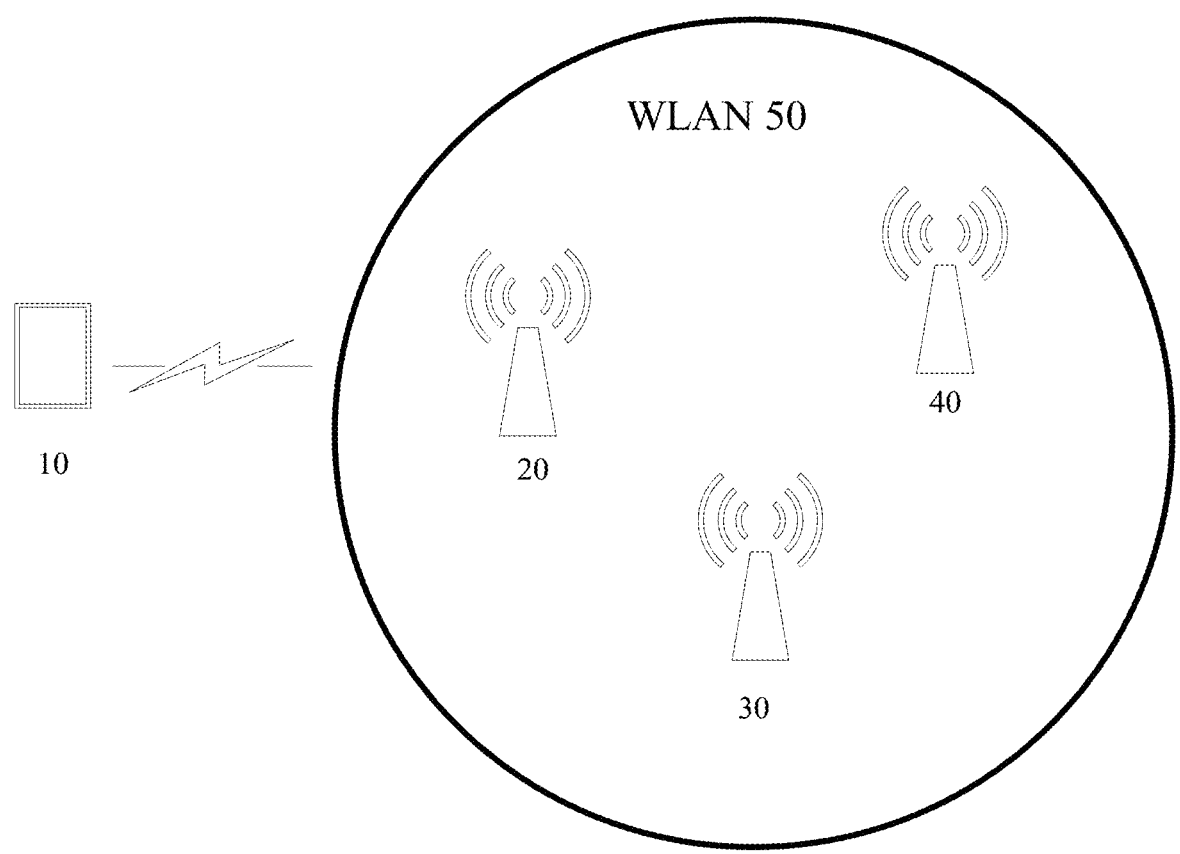
FIG. 1 shows an exemplary architecture for assisting in positioning an AP according to an embodiment of the present disclosure.

FIG. 1 shows an exemplary architecture for assisting in positioning an AP according to an embodiment of the present disclosure.

Referring to FIG. 1, the exemplary architecture 1 may include positioning device 10 and APs 20, 30 and 40. The APs 20, 30 and 40 may consist of a Wireless Local Area Network (WLAN) 50. The positioning device 10 may connect to WLAN 50.

GPS signals may be typically blocked and reflected by obstacles such as walls, windows, and the like, so the AP with built-in GPS modules may not be positioned successfully indoors.

In view of this, the present disclosure proposes to use the positioning device 10 installed at an outdoor location to assist in positioning the AP for the AFC authentication. Although the AP may be placed at an indoor location, the positioning device 10 may be installed outdoors and thus the accuracy of the positioning of the AP can be higher than that of positioning the AP by a GPS module deployed in the AP.

Figure 2:
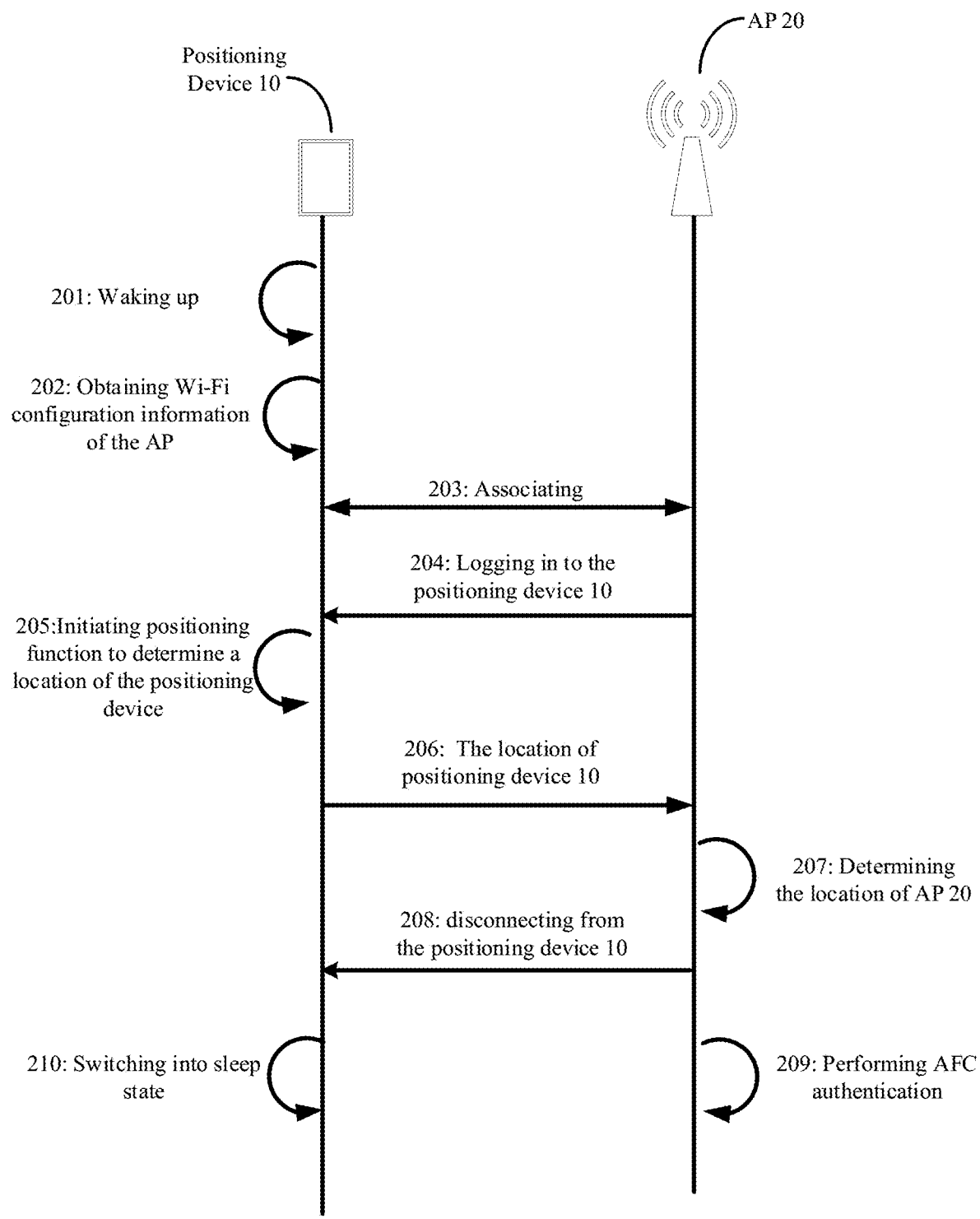
FIG. 2 shows an exemplary schematic diagram illustrating an example of interactions between a positioning device and an AP for assisting in positioning the AP according to an embodiment of the present disclosure.

FIG. 2 shows an exemplary schematic diagram illustrating an example of interactions between the positioning device 10 and the AP 20 for assisting in positioning the AP 20 according to an embodiment of the present disclosure.

At step 201, the positioning device 10 may be woken up. That is, the positioning device 10 may be switched from a power-off state or a sleep state into an operating state.

In this step, waking up the positioning device 10 may include waking up the positioning device 10 at a predetermined wake-up time or waking up the positioning device in response to receiving an instruction for waking up the positioning device 10.

The AFC authentication is typically required to be performed once a day. In order to conserve the power of the positioning device 10, it is expected that the positioning device 10 may wake up once a day. Therefore, the positioning device 10 can be configured to wake up at the predetermined wake-up time every day. To obtain a high accuracy positioning result, it is desirable to select a time in a day when the highest accuracy positioning occurs as the predetermined wake-up time.

The predetermined wake-up time may be selected when the positioning device 10 is used for the first time or may be selected upon receiving an instruction to select the predetermined wake-up time.

In an embodiment of the present disclosure, the predetermined wake-up time may be determined by: initiating the positioning function to determine the location of the positioning device at each of a plurality of tested wake-up times; obtaining one or more positioning parameters for each of the plurality of tested wake-up times; and determining one of the plurality of tested wake-up times as the predetermined wake-up time based on the one or more positioning parameters for each of the plurality of tested wake-up times.

In an embodiment of the present disclosure, the one or more positioning parameters for each of a plurality of tested wake-up times comprise at least one of: the positioning duration taken by the positioning corresponding to the tested wake-up time, the number of satellites used during the positioning corresponding to the tested wake-up time, or the strength of signals emitted by the satellites during the positioning corresponding to the tested wake-up time. The strength may be the average strength of the signals emitted by more than one satellites.

In an embodiment of the present disclosure, these positioning parameters are considered according to their priority. For example, the priority of these positioning parameters from high to low may be the positioning duration, the number of satellites, and the strength of signals emitted by the satellites.

For example, the user may set or the positioning device 10 may randomly generate four tested wake-up times as 06:00, 12:00, 18:00 and 24:00. First, the positioning device 10 may wake up at 06:00 and carry out the first positioning operation. The positioning device 10 may obtain the positioning duration, the number of satellites, and the strength of the signals emitted by the satellites for the first positioning operation corresponding to the tested wake-up time 06:00 as 40 s, 3 and −180 dBW, respectively. Second, the positioning device 10 may wake up and carry out the second positioning operation at 12:00. The positioning device 10 may obtain the positioning duration, the number of satellites, and the strength of signals emitted by the satellites for the second positioning operation corresponding to the tested wake-up time 12:00 as 40 s, 4 and −180 dBW, respectively. Third, the positioning device 10 may wake up and carry out the third positioning operation at 18:00. The positioning device 10 may obtain the positioning duration, the number of satellites, and the strength of signals emitted by the satellites for the third positioning operation corresponding to the tested wake-up time 18:00 as 40 s, 5 and −170 dBW, respectively. Fourth, the positioning device 10 may wake up and carry out the fourth positioning operation at 24:00. The positioning device 10 may obtain the positioning duration, the number of satellites, and the strength of signals emitted by the satellites for the fourth positioning operation corresponding to the tested wake-up time 24:00 as 30 s, 6 and −170 dBW, respectively. According to the priority of these positioning parameters, the selection of the predetermined wake-up time is based first on the positioning duration, second on the number of satellites and third on the strength of the signals emitted by the satellites. Therefore, the tested wake-up time of 24:00 with the shortest positioning duration is selected as the predetermined wake-up time.

For another example, the obtained positioning durations for the first to fourth positioning operations corresponding to 06:00, 12:00, 18:00 and 24:00, respectively, are 50 s, 51 s, 52 s and 53 s, respectively. The number of satellites for the first to fourth positioning operations corresponding to 06:00, 12:00, 18:00 and 24:00, respectively, are 3, 4, 6 and 3, respectively. The obtained strength of the signals emitted by the satellites for the first to fourth positioning operations corresponding to 06:00, 12:00, 18:00 and 24:00, respectively, are −180 dBW, −170 dBW, −160 dBW and −150 dBW, respectively. Since the differences among the first to fourth positioning durations corresponding to 06:00, 12:00, 18:00 and 24:00, respectively, are too small, the predetermined wake-up time is determined based on the number of satellites. Therefore, the tested wake-up time of 18:00 with the maximum number of satellites can be determined as the predetermined wake-up time.

In this step, alternatively, waking up the positioning device 10 includes waking up the positioning device in response to receiving an instruction for waking up the positioning device 10. For example, the user may want to urgently obtain the location of the positioning device 10. The positioning device 10 may be configured with a switch in hardware or software form that can be switched to forcibly wake up the positioning device 10.

In an embodiment of the present disclosure, the user may want to select an optimal placement location for the AP 20 to increase the accuracy of the positioning of the AP 20. The user can change the placement location of the AP 20 and instruct the positioning device 10 to obtain the location of the positioning device 10 immediately. Later, the user can view the positioning result of each positioning operation corresponding to each placement location on an APP related to the AP 20 and select the optimal placement location for the AP 20.

At step 202, the positioning device 10 may obtain Wi-Fi configuration information of the AP 20.

In this step, once the positioning device 10 is woken up, the positioning device 10 may detect the value of a network access state indicator, TSS_flag. The value 1 of the network access state indicator, TSS_flag, indicates that the AP 20 was accessed by the positioning device 10. The value 0 of the network access state indicator, TSS_flag, indicates that the AP 20 was not accessed by the positioning device 10.

In an embodiment, after detecting that the value of a network access state indicator, TSS_flag, is 1, the positioning device 10 may obtain the Wi-Fi configuration information wifi_config of the AP 20 from a memory of the positioning device 10. The Wi-Fi configuration information wifi_config may be written into the memory when the positioning device 10 was previously associated with the AP 20. The Wi-Fi configuration information may include the Service Set Identifier (SSID) of the AP 20, a password and a token, bind_token. The password is to be used by the positioning device 10 to associate itself with the AP 20. The token, bind_token, is to be used by the AP 20 to login to the positioning device 10 such that the positioning device 10 can transmit its location to the AP 20.

In another embodiment, after detecting that the value of a network access state indicator, TSS_flag, is 0, the positioning device 10 may conduct a process to obtain the Wi-Fi configuration information from the AP. This will be described with respect to FIG. 3.

At step 203, the positioning device 10 is associated with the AP 20 based on the Wi-Fi configuration information.

In this step, once the positioning device 10 obtains the SSID and the password from the Wi-Fi configuration information, the positioning device 10 can send the SSID and the password to the AP 20 such that the positioning device 10 can be associated with the AP 20. For example, upon being associated with the AP 20, the positioning device 10 can initiate its Http server to wait for the AP 20 to login to it.

In an embodiment of the present disclosure, the associating may fail due to a failure occurring in the AP 20. Under this circumstance, the positioning device 10 switches into a sleep state and wakes up after a time interval based on the number of times that the associating has failed continuously. For example, the time interval can be calculated based on the Equation 1.

$$\text{Twake}(h) = \max\left(\frac{24}{2^n}, 6\right) \tag{1}$$

Where the Twake (h) is the time interval with the unit of hour, n is the number of times that the associating has failed continuously. It can be seen from Equation 1 that the minimum time interval may be 6 hours. That is, the positioning device 10 may wake up at most 4 times in one day.

Such a configuration can avoid wasting the power of the positioning device 10 due to waking up too many times in one day. It should be noted that the value "6" in Equation 1 can be changed depending on the maximum number of times that the positioning device 10 is expected to be woken up.

At step 204, the positioning device 10 may login to the AP 20 based on the token obtained from the Wi-Fi configuration information.

In this step, since the positioning device 10 has obtained the token from the Wi-Fi configuration information obtained at step 202, the positioning device 10 may verify the login of the AP 20 with the token.

At step 205, the positioning device 10 may initiate the positioning function to determine the location of the positioning device 10 based on a predetermined condition being met.

In this step, the positioning device 10 may determine the location of the positioning device 10 according to the GPS positioning technique, e.g., by means of a built-in GPS module.

In an embodiment of the present disclosure, the predetermined condition may comprise the positioning device 10 being woken up. In other words, the positioning device 10 may initiate the positioning function after waking up. The expression "after waking up" here does not limit the positioning device 10 to initiating the positioning function immediately after the step 201. The positioning device 10 may also initiate the positioning function before or after the step 202 or step 203.

In another embodiment of the present disclosure, the predetermined condition may comprise an instruction for initiating the positioning function being received from the AP 20. In other words, the positioning device 10 may initiate the positioning function after receiving the instruction for initiating the positioning function from the AP 20. For an example, the geographical location of the AP 20 may remain unchanged or change almost negligibly (e.g., within the 95% confidence range of the geographical location of the AP 20). At this point, the AP 20 may continue to use the location of the positioning device 10 sent from the positioning device 10 last time and thus send an instruction for not initiating the positioning function to the positioning device 10. The positioning device 10 may switch itself into the sleep state after receiving the instruction for not initiating the positioning function to save its power. For another example, the geographical location of the AP 20 may change significantly in the predetermined period. Under this circumstance, the AP may be restarted in the predetermined period since it may have been lost power or updated after changing its location. The predetermined period may be the time interval between two continuous waking-ups of the positioning device 10. Therefore, the AP 20 may send to the positioning device 10 the instruction for initiating the positioning function in response to the AP 20 being restarted in the predetermined period. Then the positioning device 10 may initiate the positioning function after receiving the instruction for initiating the positioning function. On the other hand, if the AP 20 has not been restarted in the predetermined period, the location of the AP 20 may not change significantly, the AP 20 may send to the positioning device 10 the instruction for not initiating the positioning function.

At step 206, the positioning device 10 may transmit the location of the positioning device 10 to the AP 20.

In this step, the positioning device 10 may detect the login of the AP 20 and transmit the location of the positioning device 10 to the AP 20.

In this step, the positioning device 10 may include the location of the positioning device 10 determined at step 205 in a positioning information and then transmit the positioning information to the AP 20. The positioning information may further include one or more positioning parameters for the positioning operation at step 205, such as the positioning duration taken by the positioning operation at step 205, the number of satellites used during the positioning operation at step 205, and the strength of the signals emitted by the satellites during the positioning operation at step 205. These positioning parameters are to be transmitted by the AP 20 to a user equipment (UE), such as a mobile phone, a wearable communication device, a laptop computer, a desktop computer, a tablet computer, a personal Digital Assistant (PDA), or the like, to be used to evaluate the effect of the positioning at step 205.

At step 207, the AP 20 may determine its location based on the location of the positioning device 10.

In this step, the AP 20 may determine its location based on the location of the positioning device 10 and the Received Signal Strength Indication, RRSI, e.g., of the positioning information. For example, the AP 20 may adjust an antenna reflector or the angle of a mechanical antenna to receive the positioning information from the positioning device 10. Therefore, the AP 20 may derive the orientation of the positioning device 10 according to the orientation of the adjusted antenna reflector or the mechanical antenna. After determining the orientation of the positioning device 10, the AP 20 may calculate the distance between the positioning device 10 and the AP 20 using the RSSI. The RSSI is typically inversely proportional to the distance.

In this step, the AP 20 may alternatively determine its location based on the location of the positioning device 10 and information indicating the location offset between the AP 20 and the positioning device 10. For example, the AP 20 may be placed on a bookcase indoors and the positioning device 10 may be attached to a window outdoors. The distance between the AP 20 and the positioning device 10 can be measured as the location offset and entered by the user into the AP 20.

According to embodiments of the present disclosure, the AP 20 can determine its location with the assistance of the positioning device 10, such that the AP 20 does not need a built-in GPS module. Even when the AP 20 is installed indoors, the resulting location of the AP can be ensured to have high accuracy. In an embodiment of the present disclosure, the positioning device 10 may determine and transmit the location of the positioning device 10 after waking up, thereby reducing the load on the AP 120 and reducing the signaling overhead between the AP 20 and the positioning device 10. In another embodiment of the present disclosure, the positioning device 10 may determine and transmit the location of the positioning device 10 after receiving an instruction for initiating the positioning function or may enter the sleep state after receiving an instruction for not initiating the positioning function, thereby conserving the power of the positioning device 10.

According to an embodiment, after logging in to the positioning device 10, the AP 20 can send packet data to the positioning device 10, such as ephemeris almanac for positioning and/or a firmware file for updating the firmware of the positioning device 10.

According to an embodiment, after logging in to the positioning device 10, the AP 20 may transmit a control instruction to wake up the positioning device 10 at the predetermined wake-up time or in response to the AP being restarted. The AP 20 being restarted means that the AP may have changed its location. That is, the AP 20 may control the positioning device 10 to wake up whenever it needs the location of the positioning device 10.

According to an embodiment, the example of interactions may optionally include step 208. In this step, the AP 20 may disconnect from the positioning device 10 such that the positioning deceive 10 switches into the sleep state.

For an example, the disconnection between the positioning device 10 and the AP 20 may be caused by the positioning device 10 automatically switching to a sleep state after transmitting the location of positioning device 10 at step 206. That is, the positioning device 10 may switch into the sleep state in response to transmitting the location of the positioning device 10. For another example, the disconnection between the positioning device 10 and the AP 20 may also be caused by the AP 20 logging out of the positioning device 10 after receiving the location of the positioning device 10. The positioning device 10 may switch into the sleep state in response to detecting the logout of the AP 20. In this way, the positioning device 10 is dedicated to assisting the AP in positioning. The positioning device 10 can switch into the sleep state after transmitting its location to the AP and wake up until its location is next needed to be provided to the AP, so that the power of the positioning device is consumed almost exclusively to assist the AP in positioning. This maximizes the amount of time that the positioning device can be used after a single charge.

According to an embodiment, the example of interactions may optionally include step 209. In this step, the AP 20 may perform the AFC authentication using the determined location of the AP 20. This allows for a higher success rate for the AFC authentication of the AP 20 compared to the scenario in which the AP 20 determines its location using a built-in GPS module.

As described in step 208, the positioning device 10 may switch into the sleep state in response to transmitting the location of the positioning device 10 or in response to detecting the logout of the AP 20. Therefore, the example of interactions may include step 210 in which the positioning device 10 may switch into the sleep state to save power. It should be noted that step 210 may also be performed before or after, or in parallel with the any of steps 207 to 209.

Figure 3:
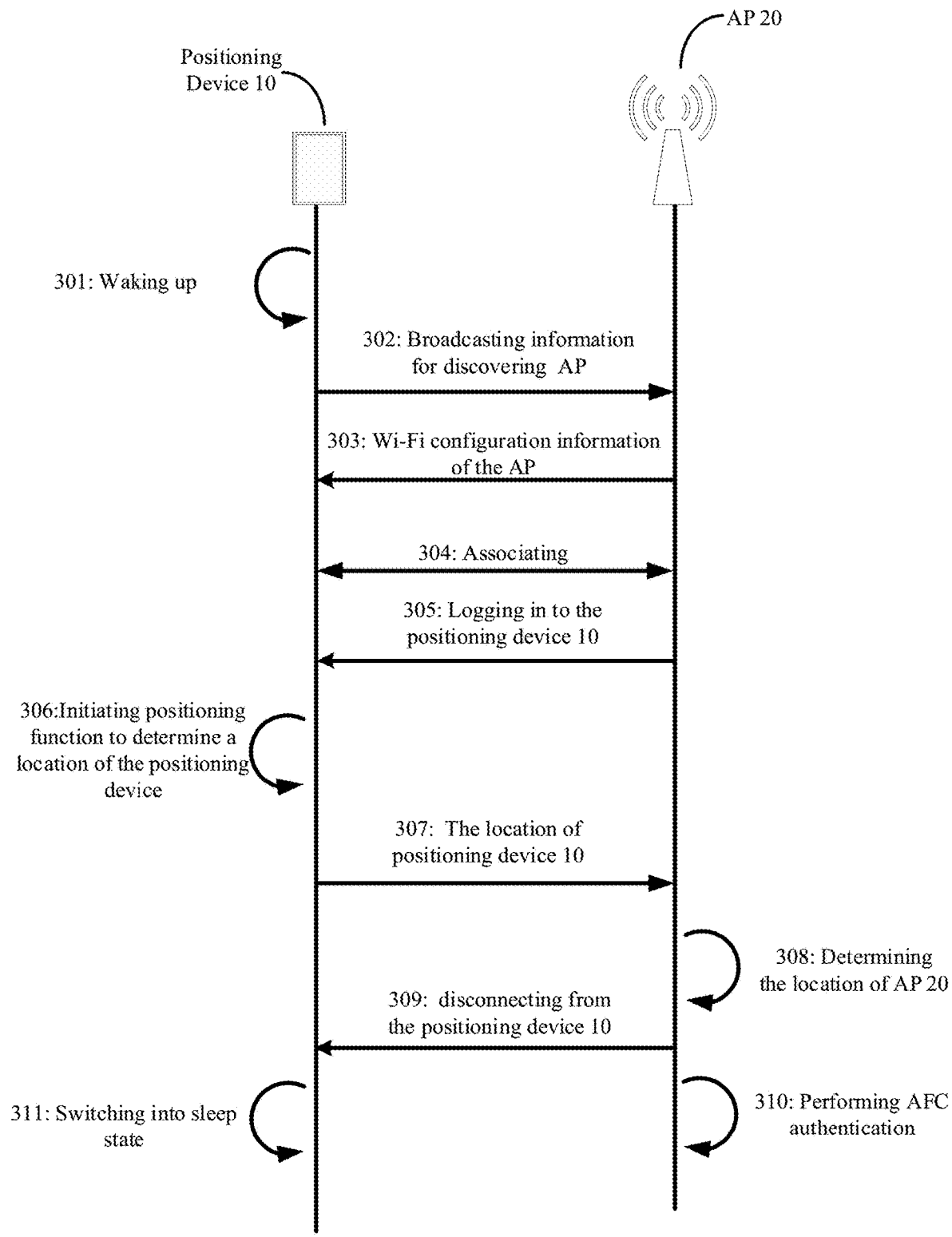
FIG. 3 shows an exemplary schematic diagram illustrating another example of interactions between the positioning device and the AP for assisting in positioning the AP according to another embodiment of the present disclosure.

FIG. 3 shows an exemplary schematic diagram illustrating another example of interactions between the positioning device and the AP for assisting in positioning the AP according to an embodiment of the present disclosure.

Steps 301 and 304 to 311 of FIG. 3 are basically the same as steps 201 and 203 to 210 of FIG. 2, respectively, and the details may refer to those of FIG. 2.

As mentioned above, after detecting that the value of a network access state indicator, TSS_flag, is 0, the positioning device 10 may conduct a process to obtain the Wi-Fi configuration information from the AP 20.

At step 303, the positioning device 10 may broadcast information for discovering the AP 20.

At step 304, the positioning device 10 may receive the Wi-Fi configuration information from the AP 20. In this step, the AP 20 may transmit the Wi-Fi configuration information including the Service Set Identifier (SSID) of the AP 20, the password to be used by the positioning device 10 to associate itself with the AP 20, and the token, bind_token, to be used by the AP 20 to login to the positioning device 10.

Figure 4:
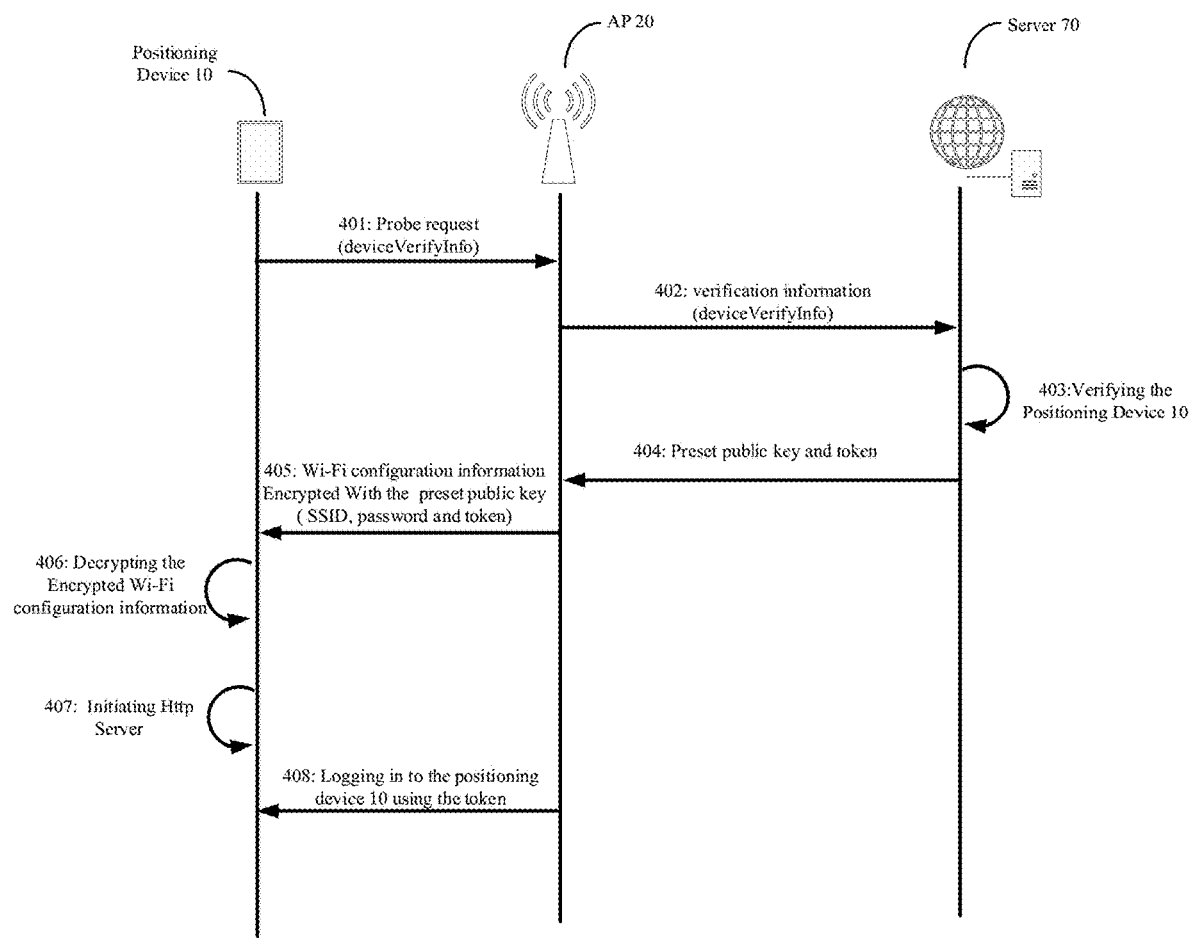
FIG. 4 shows an exemplary schematic diagram illustrating an example of interactions among the positioning device, the AP and a server for assisting in positioning the AP according to an embodiment of the present disclosure.

FIG. 4 shows an exemplary schematic diagram illustrating an example of interactions among the positioning device, the AP and a server (e.g., a cloud server) for assisting in positioning the AP to an embodiment of the present disclosure.

FIG. 4 may be considered as an example of steps 303 and 304 of FIG. 3.

At step 401, the positioning device 10 may broadcast the encrypted Probe Request frame including information, deviceVerifyInfo, for the AP 20 to verify the positioning device 10. In the example, the positioning device 10 may perform a full channel scan including residing on each channel and broadcasting the encrypted Probe Request frame on each channel to discover the AP 20 to be associated. The positioning device 10 may then finish the full channel scan and reside on the current channel to acquire the Wi-Fi configuration information of the AP 20. It should be noted that the Probe Request frame is only an example and other similar broadcast frames may be used.

At step 402, the AP 20 may report to the server 70 its MAC address and the verification information, deviceVerifyInfo, for the AP 20 to verify the positioning device 10. The AP 20 may connect to the server 70 via a network such as the Internet, wide area network (WAN), local area network (LAN), metropolitan area network, peer-to-peer, and the like.

At step 403, the server 70 may verify the positioning device 10 using the verification information, deviceVerifyInfo. For example, a secret key used to decrypt the encrypted Probe Request frame can be prestored in the server 70.

At step 404, the server 70 may send a preset public key, TssSecret.Pub, and the token, bind_Token, back to the AP 20.

At step 405, the AP 20 may encrypt the SSID, the password and the token using the preset public key, TssSecret.Pub. The encrypted SSID, the password and the token may consist of the Wi-Fi configuration information which may then be transmitted to the positioning device 10.

At step 406, the positioning device 10 may decrypt the encrypted SSID, the password and the token from the Wi-Fi configuration information using a preset private key, TssSecret.Pri, corresponding to the preset public key, TssSecret.Pub. For example, the preset private key TssSecret.Pub can be prestored in the positioning device 10 e.g., by the server 70.

At step 407, the positioning device 10 may initiate its Http Server to wait for the login of the AP 20.

At step 408, the AP 20 may login to the positioning device 10 using the token, bind_token. As a result, the positioning device 10 can be associated with the AP 20.

According to embodiments of the present disclosure, during steps 401 to 408, the encrypted Probe Request frame, the verification of the positioning device 10 by the server 70, the preset public key and the preset private key, and the token for the AP 20 to login to the positioning device 10, largely guarantee the security during data transmission and prevent the AP 20 from receiving false data from other jamming or attacking devices.

Figure 5:
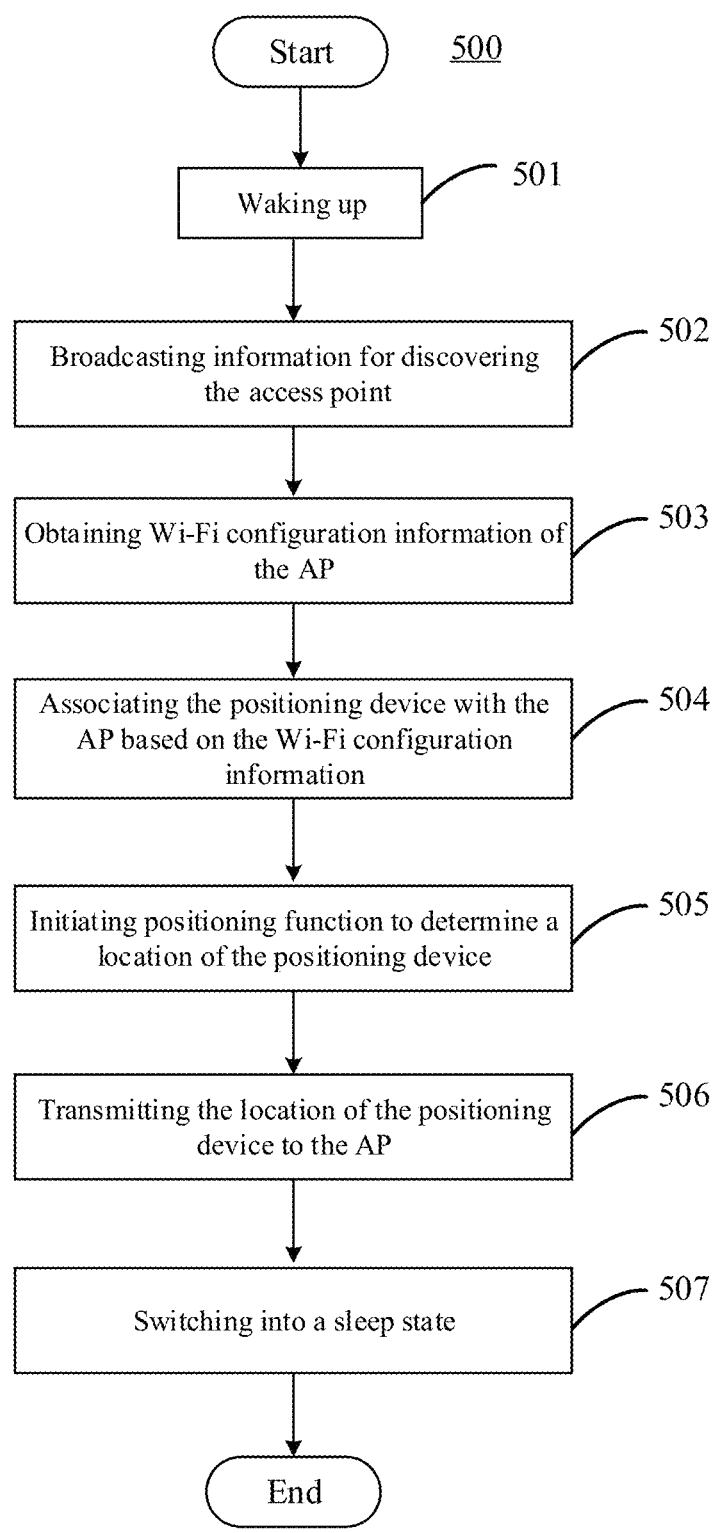
FIG. 5 shows a flowchart of a method for positioning performed by the positioning device according to an embodiment of the present disclosure.

FIG. 5 shows a flowchart of a method 500 for positioning performed by the positioning device 10 according to an embodiment of the present disclosure.

The detailed description of the method 500 can refer to the content described above with respect to FIGS. 1-4. For example, the method 500 can be executed in the architecture described with respect to FIG. 1 and according to the interactions between the positioning device 10 and the AP 20 described with respect to FIGS. 2-4. Additionally, each step of method 500 can be performed by one or more processing units, such as the central processing unit (CPU) of the positioning device 10.

With reference to FIG. 5, the method 500 may comprise steps 501-507.

At step 501, the positioning device 10 may wake up.

In an embodiment of the present disclosure, waking up the positioning device 10 includes waking up the positioning device 10 at a predetermined wake-up time or waking up the positioning device in response to receiving an indication for waking up the positioning device 10.

In an embodiment of the present disclosure, the predetermined wake-up time is determined by: initiating the positioning function to determine the location of the positioning device at each of a plurality of tested wake-up times; obtaining one or more positioning parameters for each of the plurality of tested wake-up times; and determining one of the plurality of tested wake-up times as the predetermined wake-up time based on the one or more positioning parameters for each of the plurality of tested wake-up times.

In an embodiment of the present disclosure, one or more positioning parameters for each of a plurality of tested wake-up times comprise at least one of: the positioning duration taken by the positioning operation corresponding to the tested wake-up time, the number of satellites used during the positioning operation corresponding to the tested wake-up time, or the strength of the signals emitted by the satellites during the positioning operation corresponding to the tested wake-up time.

At step 502, the positioning device 10 may broadcast information for discovering the AP to obtain the Wi-Fi configuration information of the AP 20 from AP 20.

It should be noted that, if the positioning device 10 detects that the value of a network access state indicator, TSS_flag, is 1, step 502 should be skipped. The value 1 of TSS_flag indicates that the Wi-Fi configuration information of the AP 20 was written into the memory of the positioning device 10 during the previous association between the positioning device 10 and the AP 20.

At step 503, the positioning device 10 may obtain the Wi-Fi configuration information of the AP 20. The Wi-Fi configuration information may be read from the memory of the positioning device 10 if the Wi-Fi configuration information was written into the memory of the positioning device 10 during the previous association between the positioning device 10 and the AP 20 (i.e., step 502 is skipped) or may be obtained from the AP 20 (i.e., step 502 is not skipped).

At step 504, the positioning device 10 may be associated with the AP 20 based on the Wi-Fi configuration information.

At step 505, the positioning device 10 may initiate the positioning function to determine the location of the positioning device 10.

At step 506, the positioning device 10 may transmit the location of the positioning device to the AP 20.

At step 507, the positioning device 10 may switch into sleep state to conserve power.

The steps 501 to 507 are basically the same as the steps 301 to 304, 306 to 307 and 311 of FIG. 3 and the details may refer to those of FIGS. 2 and 3.

According to embodiments of the present disclosure, the positioning device 10 can switch into the sleep state after transmitting its location to the AP and wake up until its location is next needed to be provided to the AP, so the power of the positioning device is consumed almost exclusively to assist the AP in positioning. This allows the amount of time that the positioning device can be used after a single charge maximized, which is especially beneficial for the positioning device installed outdoors.

Figure 6:
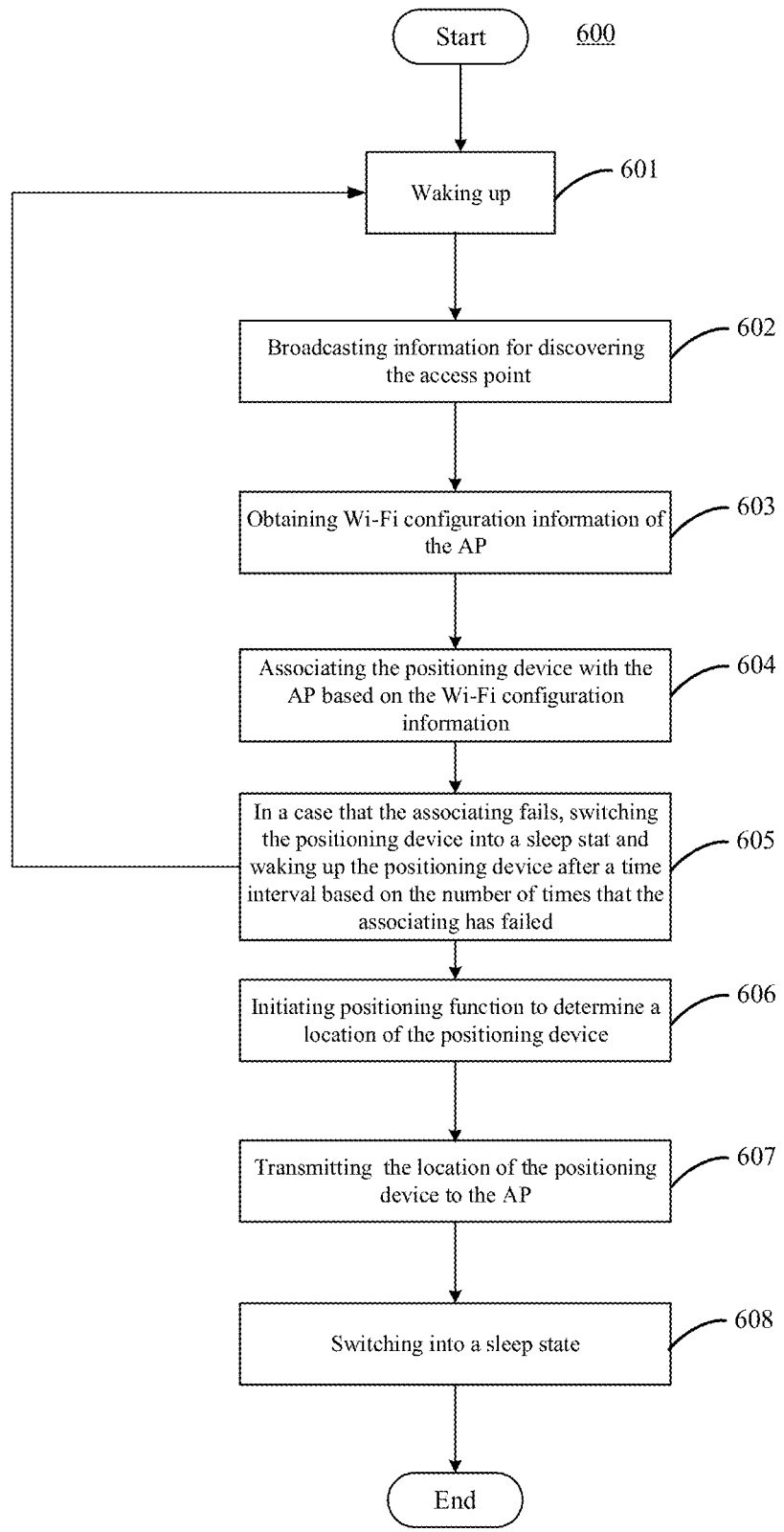
FIG. 6 shows a flowchart of a method for positioning performed by the positioning device according to another embodiment of the present disclosure.

FIG. 6 shows a flowchart of the method 600 for positioning performed by the positioning device 10 according to another embodiment of the present disclosure.

Steps 601 to 604 of FIG. 6 are basically the same as steps 501 to 504 of FIG. 5 and steps 606 to 608 are basically the same as steps 505 to 507 and the details may refer to those of FIG. 5.

At step 605, if the association of step 604 fails, the positioning device 10 may switch into the sleep state and wake up after a time interval based on the number of times that the association has failed. For example, the time interval may be calculated by Equation 1.

The operation related to the positioning device 10 to handle the failed association has been described with respect to step 203 and is not repeated here.

Figure 7:
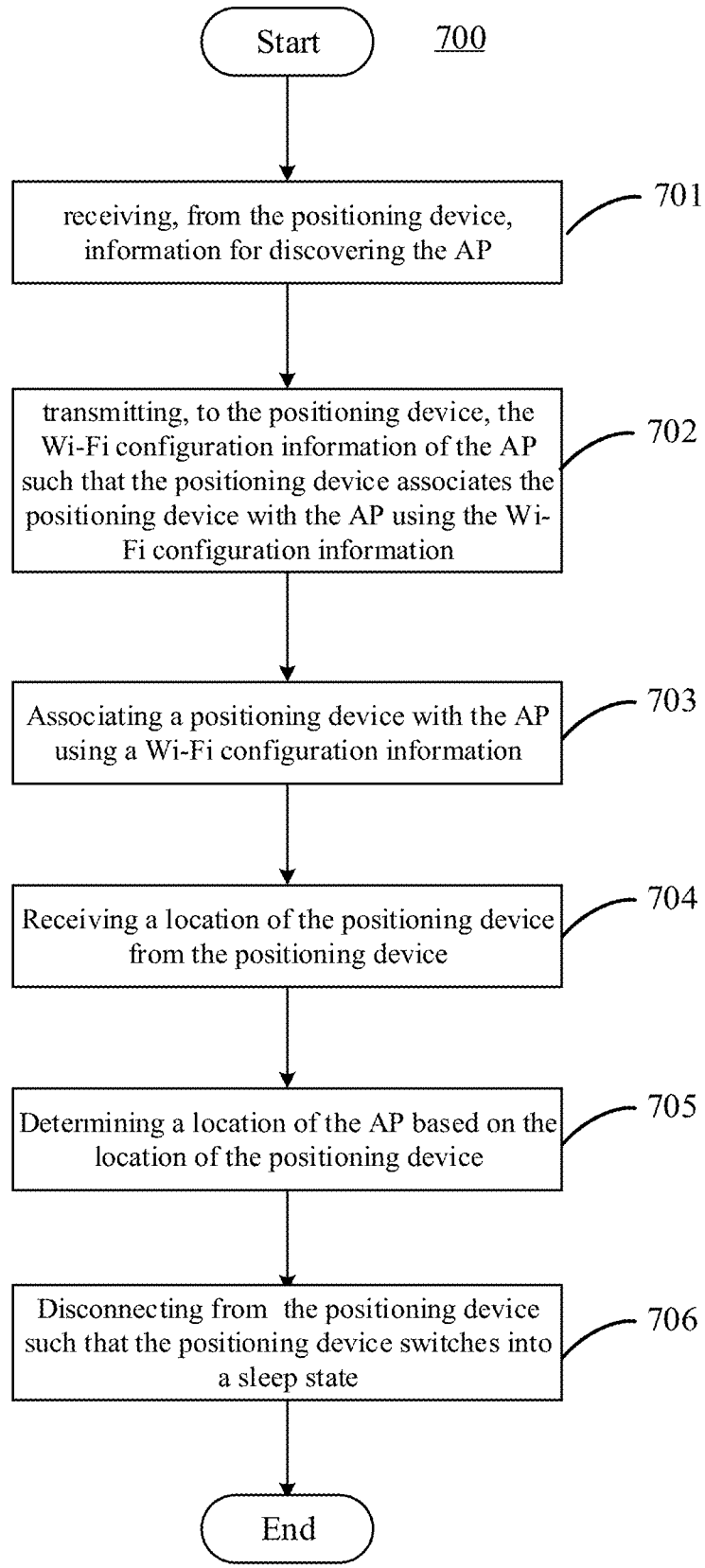
FIG. 7 shows a flowchart of a method for positioning performed by the AP according to an embodiment of the present disclosure.

FIG. 7 shows a flowchart of the method 700 for positioning performed by the AP 20 according to an embodiment of the present disclosure.

The detailed description of the method 700 can refer to the content described above with respect to FIGS. 1-4. For example, method 700 can be executed in the architecture described with respect to FIG. 1 and according to the interactions between the positioning device 10 and AP 20 described with respect to FIGS. 2-4. Additionally, each step of method 700 can be performed by one or more processing units, such as the central processing unit (CPU) of the AP 20.

With reference to FIG. 7, the method 700 may comprise steps 701-706.

At step 701, the AP 20 may receive information for discovering the AP 20 from the positioning device 10 after the positioning device being woken up.

At step 702, the AP 20 may transmit, to the positioning device 10, the Wi-Fi configuration information of the AP such that the positioning device 10 can associate the positioning device 10 with the AP 20 using the SSID and the password included in the Wi-Fi configuration information.

It should be noted that, if the positioning device 10 detects that the value of a network access state indicator, TSS_flag, is 1, steps 701 and 702 should be skipped. The value 1 of TSS_flag indicates that the Wi-Fi configuration information of the AP 20 was written into the memory of the positioning device 10 during the previous association between the positioning device 10 and the AP 20.

At step 703, the AP 20 may associate the positioning device 10 with the AP 20. In this step, the positioning device 10 may send the SSID and password from the Wi-Fi configuration information to the AP 20. As a result, the positioning device 10 can be associated with the AP 20.

At step 704, the AP 20 may receive a location of a positioning device 10 from the positioning device 10.

In this step, the AP 20 may login to the positioning device 10 using the token, bind_toke, so that the positioning device 10 can transmit the location of a positioning device 10 to the AP 20.

At step 705, the AP 20 may determine its location based on the location of the positioning device 10.

In this step, for an example, the AP 20 may determine the location of the AP 20 based on the location of the positioning device and the Received Signal Strength Indication, RRSI. For another example, the AP 20 may obtain information indicating a location offset between the AP 20 and the positioning device 10 and determine the location of the AP 20 based on the location offset and the location of the positioning device 10.

At step 706, the AP 20 may disconnect from the positioning device 10 such that the positioning device 10 switches into the sleep state.

The steps 701 to 706 are basically the same as the steps 302 to 304, steps 307 to 309 of FIG. 3 and the details may refer to those of FIGS. 2 and 3.

According to embodiments of the present disclosure, the AP 20 can disconnect from the positioning device 10 after receiving the location of the positioning device. This allows the positioning device 10 to switch into the sleep state after finishing the assisting the AP in positioning and wake up until its location is next needed to be provided to the AP, so that the power of the positioning device is consumed almost exclusively to assist the AP in positioning, thereby maximizing the amount of time that the positioning device can be used after a single charge.

Figure 8:
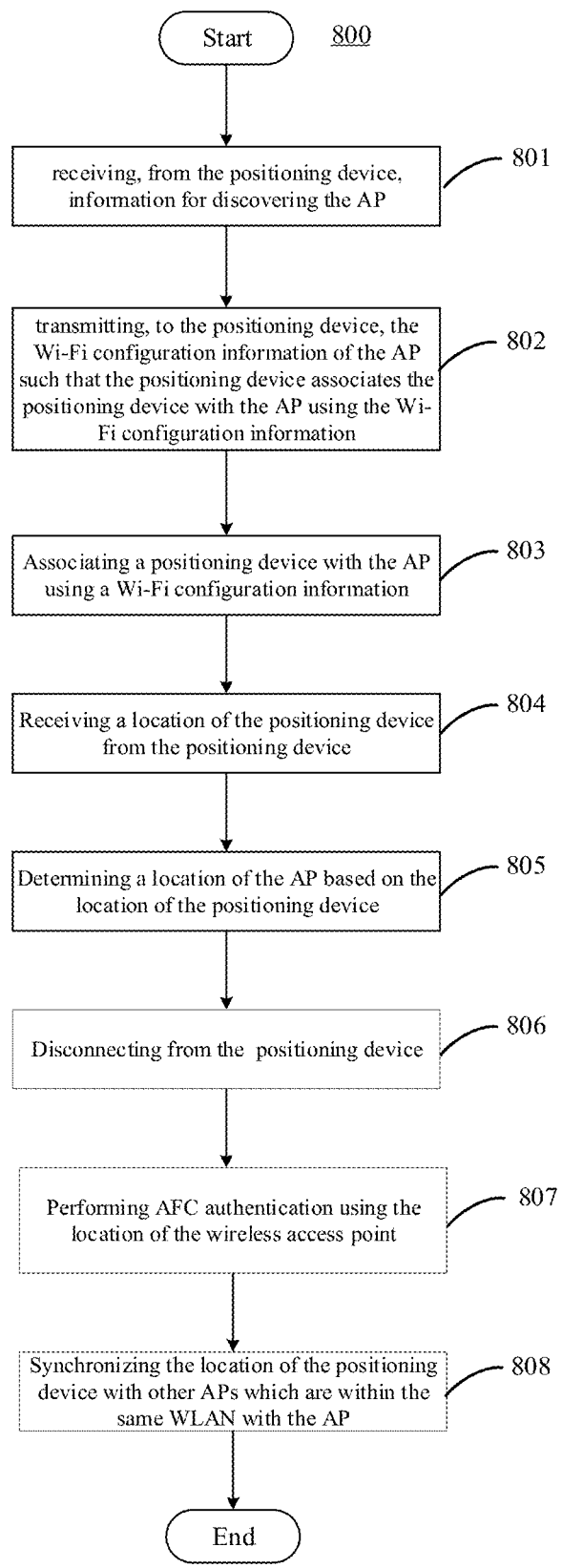
FIG. 8 shows a flowchart of a method for positioning by the AP according to another embodiment of the present disclosure.

FIG. 8 shows a flowchart of the method 800 for positioning performed by the AP 20 according to another embodiment of the present disclosure.

Steps 801 to 806 of FIG. 8 are basically the same as steps 701 to 706 of FIG. 7 and the details may refer to those of FIG. 7.

Optionally, the method 600 may further comprise step 807. At step 807, the AP 20 may perform the AFC authentication using the determined location of the AP 20.

Optionally, the method 600 may further comprise step 808. At step 808, the AP 20 may synchronize the location of the positioning device 10 with other APs which are within the same WLAN of the AP 20. In this step, referring to FIG. 1, the AP 20 may synchronize the location of the positioning device 10 with the APs 30 and 40 which are within the same WLAN 50 with the AP 20. It should be noted that step 808 may be performed before or after, or in parallel with the any of steps 806 and 807. This allows a single positioning device 10 to assist multiple APs in positioning, thereby reducing the cost.

In an embodiment of the present disclosure, the method 700 or 800 further comprises: transmitting a control instruction to wake up the positioning device 10 at a predetermined wake-up time or other time.

Figure 9:
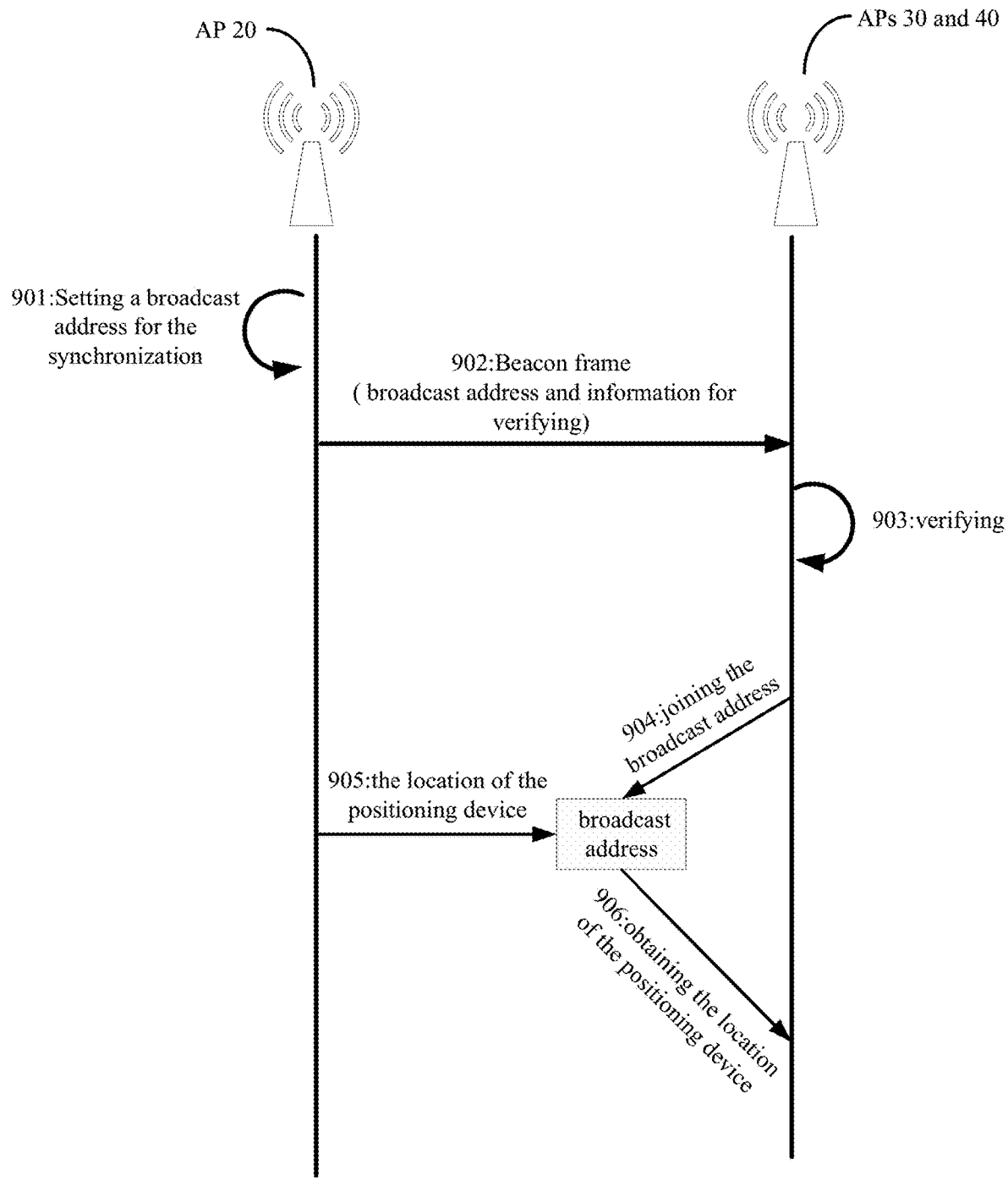
FIG. 9 shows an exemplary schematic diagram illustrating an example of interactions between the AP and other APs for synchronizing the location of the positioning device with the other APs according to an embodiment of the present disclosure.

FIG. 9 shows an exemplary schematic diagram illustrating an example of interactions between the AP 20 and other APs 30 and 40 for synchronizing the location of the positioning device according to an embodiment of the present disclosure.

In an embodiment of the present disclosure, the step 808 can be exemplary implemented as shown in FIG. 9.

At step 901, the AP 20 may set a broadcast address for the synchronization.

At step 902, the AP 20 may transmit a Beacon frame including the broadcast address and information for the APs 30 and 40 to verify the AP 20.

At step 903, the APs 30 and 40 may verify the AP 20 using the information for the APs 30 and 40 to verify the AP 20.

At step 904, the APs 30 and 40 may join the broadcast address.

At step 905, the AP 20 may transmit the location of the positioning device 10 to the broadcast address.

At step 906, the APs 30 and 40 may obtain the location of the positioning device 10 from the broadcast address.

According to embodiments of the present disclosure, the AP 20 may synchronize the location of the positioning device 10 with the other APs 30 and 40 that are also within WLAN 50. This allows a single positioning device 10 to provide location information to a plurality of APs instead of configuring a positioning device for each AP.

It should be noted that the synchronization method shown in FIG. 9 is only an example. In the embodiment of the present disclosure, other synchronization methods may be used. For example, if the WLAN 50 is a mesh network, the AP 20 can synchronize the obtained location of the positioning device 10 with the other APs 30 and 40 that are also within the WLAN 50 by mesh network means, such as a 1905 message.

Figure 10:
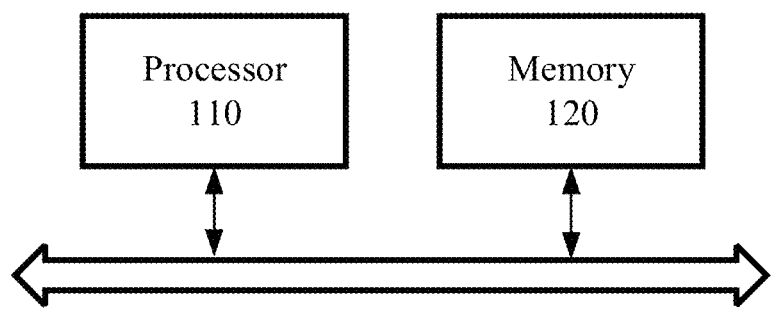
FIG. 10 is an exemplary block diagram illustrating the positioning device according to an embodiment of the present disclosure.

FIG. 10 is an exemplary block diagram illustrating the positioning device 10 according to embodiments of the present disclosure. It should be noted that the positioning device depicted in FIG. 10 can be used to perform the method 500 or method 600 as described above.

As shown in FIG. 10, the positioning device 10 may comprise a processor 110 and a memory 120. The processor 110 may be coupled with the memory 120 via a communication bus and may be configured to perform the methods 500 and 600 discussed above.

Figure 11:
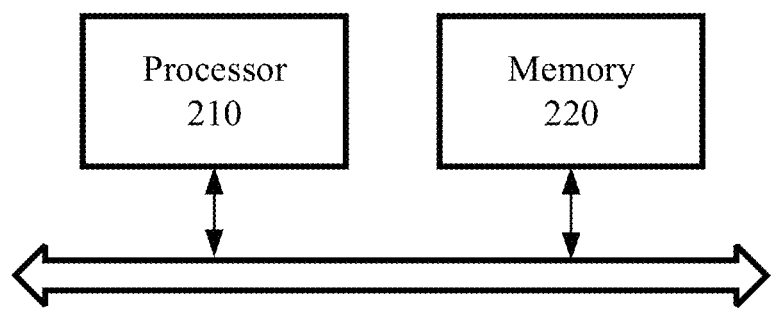
FIG. 11 is an exemplary block diagram illustrating the AP according to an embodiment of the present disclosure.

FIG. 11 is an exemplary block diagram illustrating the AP according to embodiments of the present disclosure. It should be noted that the AP depicted in FIG. 11 can be used to perform the method 700 or method 800 as described above.

As shown in FIG. 11, the AP 20 may comprise a processor 210 and a memory 220.

The processor 210 may be coupled with the memory 220 via a communication bus and may be configured to perform the methods 700 and 800 discussed above.

Examples of the processors 110 and 210 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processors 110 and 210 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 120 and 220.

The memories 120 and 220 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memories 120 and 220 may reside in the processors 110 and 210, external to the processors 110 and 210, or distributed across multiple entities including the processors 110 and 210, respectively. The memories 120 and 220 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for positioning the AP for AFC authentication is disclosed. As an example, the computer program product comprises a non-transitory computer readable storage medium having program instructions embodied therewith, and the program instructions are executable by a processor. When executed, the program instructions cause the processor to perform one or more of the above described procedure. The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for positioning performed by a positioning device, comprising:
   waking up the positioning device;
   obtaining Wi-Fi configuration information of an access point (AP);
   associating the positioning device with the AP based on the Wi-Fi configuration information;
   initiating positioning function to determine a location of the positioning device based on receiving an instruction for initiating the positioning function from the AP, or switching the positioning device into a sleep state based on receiving an instruction for not initiating the positioning function from the AP;
   in response initiating positioning function, further comprising:
      transmitting the location of the positioning device to the AP; and
      switching the positioning device into a sleep state,
   wherein the instruction for initiating the positioning function is transmitted by the AP based on the AP being restarted in a predetermined period, and wherein the instruction for not initiating the positioning function of the positioning device is transmitted by the AP based on the AP being not restarted in a predetermined period,
   wherein in a case that the associating fails, further comprising: switching the positioning device into a sleep state and waking up the positioning device after a time interval based on the number of times that the associating has failed.

2. The method of claim 1, further comprising:
   broadcasting information for discovering the AP,
   wherein the obtaining the Wi-Fi configuration information of the AP comprises:
   receiving the Wi-Fi configuration information from the AP.

3. The method of claim 2, wherein,
   broadcasting information for discovering the AP comprises: broadcasting an encrypted Probe Request frame including verification information for the AP to verify the positioning device;
   obtaining the Wi-Fi configuration information of the AP comprises:
      receiving the Wi-Fi configuration information encrypted with a preset public key, wherein the Wi-Fi configuration information includes a Service Set Identifier (SSID) of the AP, a password, and a token;
      decrypting the Wi-Fi configuration information with a preset private key corresponding to the preset public key to obtain the SSID, the password and the token;
   associating the positioning device with the AP comprises:
      associating the positioning device with the AP using the SSID and the password;
   the Wi-Fi configuration information encrypted with a preset public key is transmitted by the AP after verifying the positioning device using the verification information; and
   the token is to be used by the AP to login to the positioning device such that the positioning device transmits the location of the positioning device to the AP.

4. The method of claim 1, wherein waking up the positioning device comprises:
   waking up the positioning device at a predetermined wake-up time; or waking up the positioning device in response to receiving an instruction for waking up the positioning device.

5. The method of claim 4, wherein the predetermined wake-up time is determined by:
   initiating the positioning function to determine the location of the positioning device at each of a plurality of tested wake-up times;
   obtaining one or more positioning parameters for each of the plurality of tested wake-up times; and
   determining one of the plurality of tested wake-up times as the predetermined wake-up time based on the one or more positioning parameters for each of the plurality of tested wake-up times.

6. The method of claim 5, wherein the one or more positioning parameters for each of a plurality of tested wake-up times comprise at least one of: a positioning duration taken by the positioning corresponding to the tested wake-up time, a number of satellites used during the positioning corresponding to the tested wake-up time, or strength of signals emitted by the satellites during the positioning corresponding to the tested wake-up time.

7. A method for positioning performed by an access point (AP), comprising:
   associating a positioning device with the AP using Wi-Fi configuration information after the positioning device being woken up;
   transmitting, to the positioning device, an instruction for initiating positioning function of the positioning device for determining a location of the positioning device in response to the AP being restarted in a predetermined period, and transmitting, to the positioning device, an instruction for not initiating the positioning function of the positioning device for determining the location of the positioning device in response to the AP being not restarted in a predetermined period;
   in response to transmit the instruction for initiating positioning function of the positioning device, the method further comprising:
      receiving a location of the positioning device from the positioning device;
      determining a location of the AP based on the location of the positioning device;
      disconnecting from the positioning device such that the positioning device switches into a sleep state,
      wherein in a case that the associating fails, the positioning device switches into a sleep state and wakes up after a time interval based on the number of times that the associating has failed.

8. The method of claim 7, further comprising:
   receiving, from the positioning device, information for discovering the AP; and
   transmitting, to the positioning device, the Wi-Fi configuration information of the AP such that the positioning device associates the positioning device with the AP using the Wi-Fi configuration information.

9. The method of claim 8, wherein:
   receiving the information for discovering the AP comprises: receiving an encrypted Probe Request frame including verification information for the AP to verify the positioning device;
   transmitting the Wi-Fi configuration information of the AP comprises: transmitting Wi-Fi configuration information encrypted with a preset public key after verifying the AP using the verification information;
   the Wi-Fi configuration information includes a Service Set Identifier (SSID) of the AP, a password and a token; the SSID and the password are to be used for the associating; and
   the token is to be used by the AP to login to the positioning device.

10. The method of claim 9, further comprising:
   transmitting the verification information to a server after receiving the encrypted Probe Request frame;
   receiving the preset public key and the token from the server; and
   encrypting the Wi-Fi configuration information including the SSID, the password and the token with the preset public key.

11. The method of claim 7, further comprising:
   performing Automated Frequency Coordination (AFC) authentication using the location of the AP.

12. The method of claim 7, further comprising:
   transmitting an instruction for waking up the positioning device at a predetermined wake-up time or in response to the AP being restarted.

13. The method of claim 7, further comprising:
   synchronizing the location of the positioning device with other APs which are within the same WLAN with the AP.

14. The method of claim 13, wherein synchronizing the location of the positioning device with other APs comprises:
   setting a broadcast address for the synchronizing;
   transmitting a Beacon frame including the broadcast address and information for the other APs to verify the AP; and
   transmitting the location of the positioning device to the broadcast address,
   wherein the broadcast address is accessed by the other APs to obtain the location of the positioning device after verifying the AP.

15. The method of claim 7, wherein determining the location of the AP comprises:
   determining the location of the AP based on the location of the positioning device and Received Signal Strength Indication (RRSI), or
   obtaining information indicating a location offset between the AP and the positioning device, and determining the location of the AP based on the location offset and the location of the positioning device.

16. A system for positioning, comprising:
   a positioning device, comprising:
      a processor; and
      a memory, coupled to the processor, the processor is configured for:
         waking up the positioning device;
         obtaining Wi-Fi configuration information of the access point (AP);
         associating the positioning device with the AP based on the Wi-Fi configuration information;
         initiating positioning function to determine a location of the positioning device based on receiving an instruction for initiating the positioning function from the AP, or switching the positioning device into a sleep state based on receiving an instruction for not initiating the positioning function from the AP;
         in response initiating positioning function, the processor is further configured for:
            transmitting the location of the positioning device to the AP; and
            switching the positioning device into a sleep state, wherein the instruction for initiating the positioning function is transmitted by the AP based on the AP being restarted in a predetermined period, and
wherein the instruction for not initiating the positioning function of the positioning device is transmitted by the AP based on the AP being not restarted in a predetermined period,
wherein in a case that the associating fails, the processor is further configured for switching the positioning device into a sleep state and waking up the positioning device after a time interval based on the number of times that the associating has failed,
the AP, comprising:
a processor; and
a memory, coupled to the processor of the AP, the processor of the AP is configured for:
associating the positioning device with the AP using the Wi-Fi configuration information after the positioning device being woken up;
transmitting, to the positioning device, an instruction for initiating positioning function of the positioning device for determining a location of the positioning device in response to the AP being restarted in a predetermined period, and transmitting, to the positioning device, an instruction for not initiating the positioning function of the positioning device for determining the location of the positioning device in response to the AP being not restarted in a predetermined period;
in response to transmit the instruction for initiating positioning function of the positioning device, the processor of the AP is further configured for:
receiving a location of the positioning device from the positioning device;
determining a location of the AP based on the location of the positioning device,
wherein; and
disconnecting from the positioning device such that the positioning device switches into the sleep state,
wherein the positioning device is installed at an outdoor location.

\* \* \* \* \*